US008393536B2

(12) United States Patent
Randazza et al.

(10) Patent No.: US 8,393,536 B2
(45) Date of Patent: Mar. 12, 2013

(54) PAYMENT SYSTEM AND METHODS

(75) Inventors: Joseph R. Randazza, Boca Raton, FL (US); Danilo Portal, Miramar, FL (US)

(73) Assignee: National Payment Card, LLC, Coconut Creek, FL (US)

( * ) Notice: Subject to any disclaimer, the term of this patent is extended or adjusted under 35 U.S.C. 154(b) by 0 days.

(21) Appl. No.: 13/287,528

(22) Filed: Nov. 2, 2011

(65) Prior Publication Data
US 2012/0095854 A1  Apr. 19, 2012

Related U.S. Application Data

(63) Continuation-in-part of application No. 11/539,636, filed on Oct. 8, 2006, now abandoned.

(60) Provisional application No. 60/791,217, filed on Apr. 12, 2006.

(51) Int. Cl.
*G06K 5/00* (2006.01)
(52) U.S. Cl. ........................... 235/380; 235/375
(58) Field of Classification Search .................. 235/375, 235/380; 705/35, 39, 41
See application file for complete search history.

(56) References Cited

U.S. PATENT DOCUMENTS

| 6,678,664 | B1 | 1/2004 | Ganesan |
| 6,854,642 | B2 | 2/2005 | Metcalf et al. |
| 2004/0050928 | A1 | 3/2004 | Bishop et al. |
| 2004/0078332 | A1 | 4/2004 | Ferguson et al. |
| 2004/0205011 | A1 | 10/2004 | Northington et al. |
| 2005/0171898 | A1 | 8/2005 | Bishop et al. |
| 2005/0203857 | A1 | 9/2005 | Friedman |

FOREIGN PATENT DOCUMENTS
JP  06215234 A  8/1994

OTHER PUBLICATIONS

Higuchi JP 06215234 A, English language abstract and summary.
Best Practices, Best Practices Recommendations for the Use of Magnetic Stripes, Version 2.0, Apr. 1996.
1997 Pep Boys Signs Contract with Wright Express to Accept U.S. General Services Administration's WEX Fleet Card The Free Library (Sep. 2010), http://www.thefreelibrary.com/Pep Boys Signs Contract with Wright Express to Accept U.S. General . . .—a019738090.
MFA Oil Inks Deal with Lynk, Publication: convenience store news, http://www.allbusiness.com/retail-trade/food-stores/4480423-1.html, Date: Wednesday, Oct. 1 2003.

*Primary Examiner* — Daniel Hess
(74) *Attorney, Agent, or Firm* — Whitham Curtis Christofferson & Cook, PC

(57) ABSTRACT

Disclosed are payment system and methods.

15 Claims, 22 Drawing Sheets

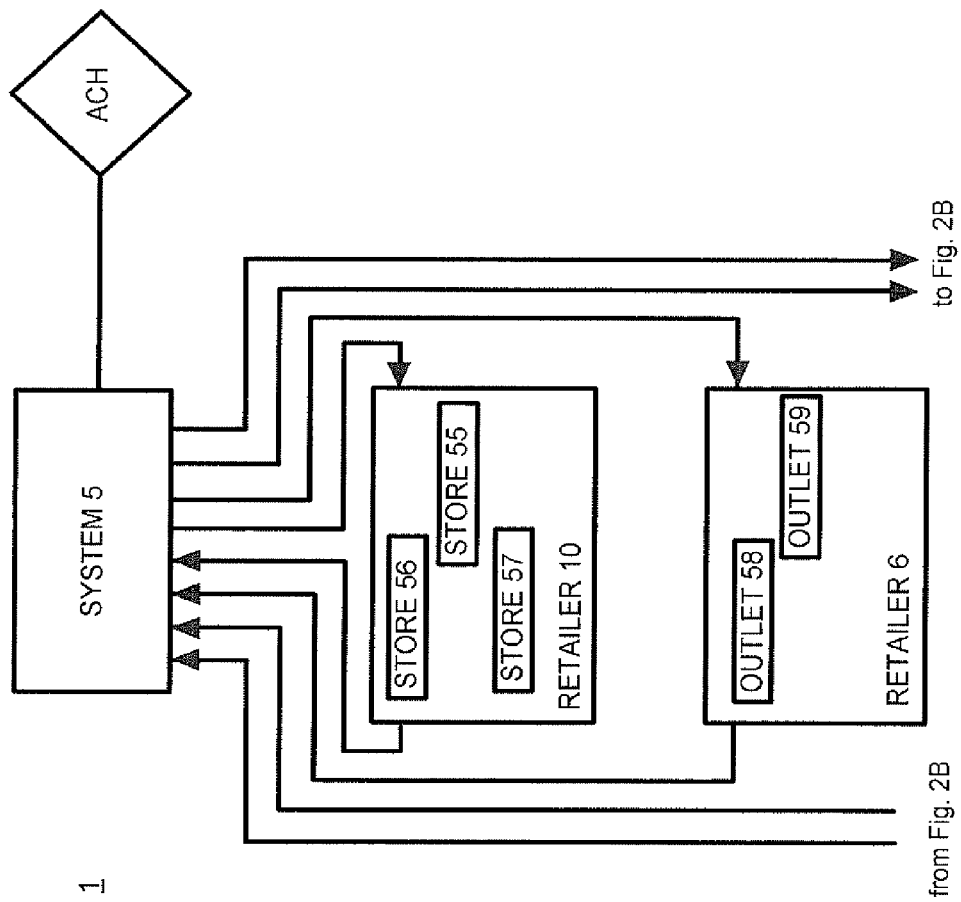

| CARD ID | ACCOUNT NUMBER | PIN |
|---|---|---|
| [card ID 1] | 8373737780387 | 82798 |
| [card ID 2] | 5620886662888 | 82681 |
| [card ID of card 215] | 1937367750748 | 60186 |
| [card ID 4] | 7863580024136 | 40876 |
| ... | ... | |
| [card ID n] | 7937678826975 | 29793 |

| CARD ID | GROCERY THRESHOLD | GAS STATION THRESHOLD | RETAILER SET 3 THRESHOLD |
|---|---|---|---|
| [card ID 1] | 400 | 200 | 500 |
| [card ID 2] | 350 | 200 | 0 |
| [card ID of card 215] | 400 | 200 | 500 |
| [card ID 4] | 400 | 600 | 2000 |
| ... | | | |
| [card ID n] | 400 | 200 | 500 |

GROCERY GROUP LIST  ID of retailer Safeway™, ID or retailer 10, ID of retailer Acme Grocery
GAS STATION GROUP LIST  ID of retailer 6, ID of Sunoco™, ID of Shell™, ID of Texaco™
RETAILER SET 3 GROUP LIST  ID of Home Depot™, ID of Beta Hardware, ID or retailer 321

| CARD ID | TRANSACTION DATE | RETAILER ID | AMOUNT |
|---|---|---|---|
| [card ID 1] | 23:12 December 12, 2006 | [ID of retailer 6] | $34.58 |
| [card ID 1] | 08:43 December 15, 2006 | [ID of retailer 12] | $12.75 |
| | ⋮ | ⋮ | |
| [card ID 215] | 22:12 December 7, 2006 | [ID of retailer 11] | $76.46 |
| [card ID 215] | 02:43 December 15, 2006 | [ID of Texaco] | $34.21 |
| [card ID 215] | 15:23 December 15, 2006 | [ID of retailer 6] | $123.75 |
| | ⋮ | ⋮ | |
| [card ID 314] | 23:12 December 12, 2006 | [ID of retailer 6] | $34.58 |
| [card ID 314] | 08:43 December 15, 2006 | [ID of retailer 12] | $12.75 |

185

| CARD ID | ACCOUNT NUMBER | PIN |
|---|---|---|
| [card ID 1] | 8373737780387 | 82798 |
| [card ID 2] | 5620886662888 | 82681 |
| [card ID of card 215] | 1937367750748 | 60186 |
| [card ID of card 215] | 5490311119588 | 12237 |
| [card ID of card 215] | 5308949466673 | 74728 |
| [card ID 4] | 7863580024136 | 40876 |
| [card ID n] | 7937678266975 | 29793 |

PAYMENT SYSTEM AND METHODS

This application claims the benefit of U.S. Application Ser. No. 60/791,217 of JOSEPH R. RANDAZZA AND DANILO PORTAL Apr. 12, 2006 for PAYMENT SYSTEMS AND METHODS, the contents of which are herein incorporated by reference.

This application is a continuation-in-part of U.S. application Ser. No. 11/539,636 of JOSEPH R. RANDAZZA AND DANILO PORTAL filed Oct. 8, 2006 for PAYMENT SYSTEMS AND METHODS, the contents of which are herein incorporated by reference.

BACKGROUND OF THE INVENTION

Field of the Invention

This invention relates generally to payment systems and methods and, more particularly, to payment systems and methods deployed in a retail environment.

SUMMARY OF THE INVENTION

According to an aspect of the present invention, there is a method for a system having a plurality of persons; a plurality of cards issued under authority of an entity; a retail site configured with a first signal, the first signal being common to the plurality of cards; the system further including a second signal on a first card in the plurality of cards; and a second system storing an association between the second signal and account information, the entity and an owner of the second system being non-affiliated. The method comprises the steps, performed at the retail site, of receiving the first and second signals from the first card; responsive to the first signal, making a routing decision; responsive to the routing decision, conditionally sending the second signal into a first hardware path, to cause the second system to perform the steps of determining whether the first card can effect payment, responsive to the determining step, conditionally sending a message to cause an institution to send an ACH entry to Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system, wherein the method further includes the step, performed at the retail site, of conditionally effecting a transaction with a holder of the first card, depending on a signal received from the second system.

According to another aspect of the present invention, there is a method for a system having a plurality of persons; a plurality of vehicles; a plurality of cards issued under authority of government, each card evidencing a license for a person to operate a vehicle; a retail site configured with a first signal, the first signal including a license card IIN number, the first signal being common to the plurality of cards; the system further including a second signal on a first card in the plurality of cards, the second signal including a personal ID number; and a server storing an association between the second signal and account information. The method comprises the steps, performed at the retail site, of receiving the first and second signals from the first card; responsive to the first signal, making a routing decision; responsive to the routing decision, conditionally sending the second signal into a first hardware path, to cause the server to perform the steps of determining whether the first card can effect payment, responsive to the determining step, conditionally sending a message to cause an institution to send an ACH entry to Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system, wherein the method further includes the step, performed at the retail site, of conditionally effecting a transaction with a holder of the first card, depending on a signal received from the server.

According to yet another aspect of the present invention, A transaction system for operating with a system having a plurality of persons; a plurality of cards issued under authority of an entity; a retail site configured with a first signal, the first signal being common to the plurality of cards; the system further including a second signal on a first card in the plurality of cards; and a second system storing an association between the second signal and account information, the entity and an owner of the second system being non-affiliated, the transaction system comprising means for receiving the first and second signals from the first card; means, responsive to the first signal, for making a routing decision; means, responsive to the routing decision, for conditionally sending the second signal into a first hardware path, to cause the second system to perform the steps of determining whether the first card can effect payment, responsive to the determining step, conditionally sending a message to cause an institution to send an ACH entry to Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system; and means for conditionally effecting a transaction with a holder of the first card, depending on a signal received from the second system.

BRIEF DESCRIPTION OF THE DRAWINGS

References are made to the following text taken in connection with the accompanying drawings, in which:

FIGS. 2A and 2B show another aspect of the first exemplary system.

FIG. 9 is a representation of a table in a database in the first exemplary system.

FIG. 12 shows another data structure in an exemplary system.

FIG. 13 shows another data structure in an exemplary system.

FIG. 16 shows another data structure in an exemplary system.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

First Exemplary System

Figure 1:
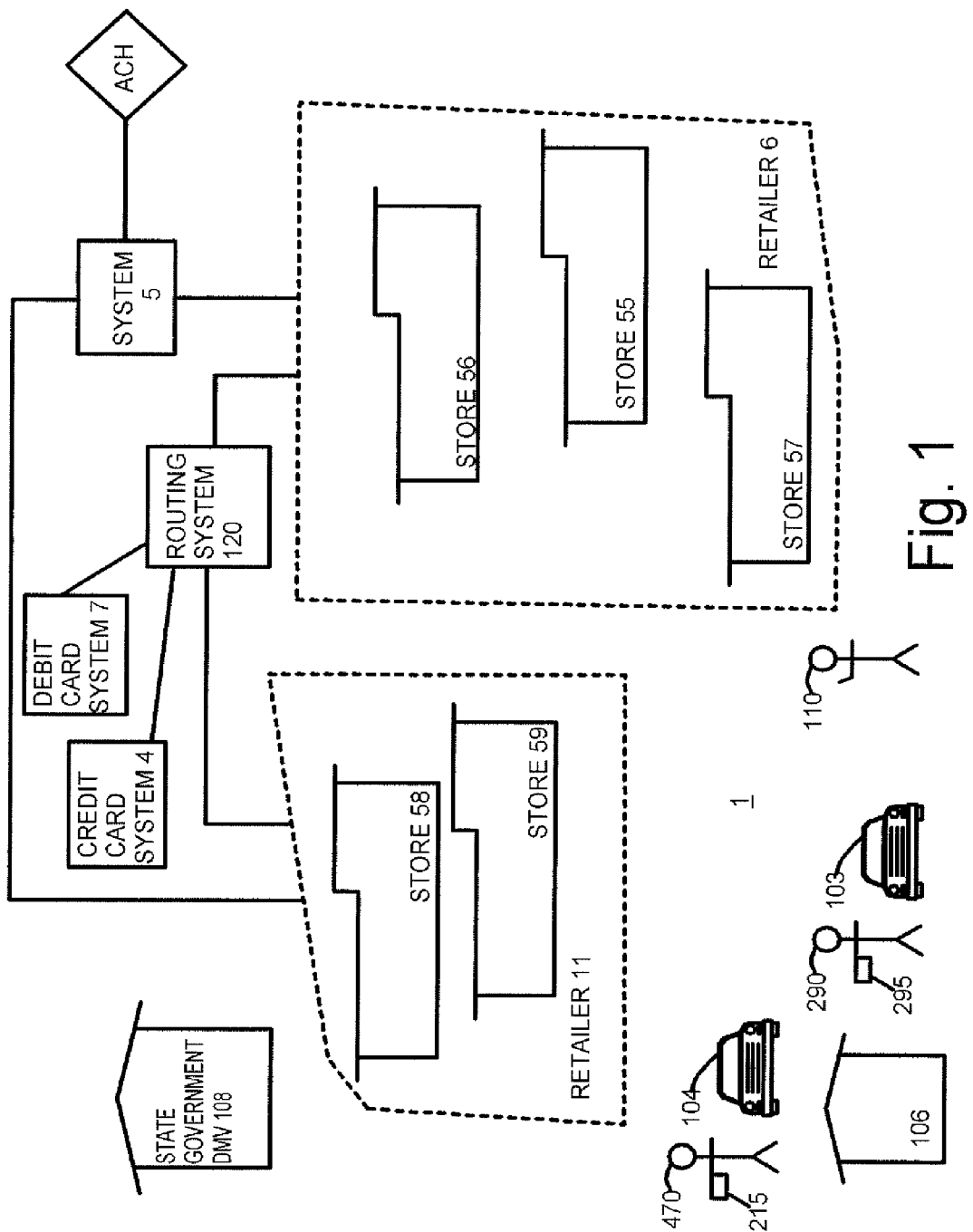
FIG. 1 shows a retail system according to a first exemplary embodiment of the present invention.

FIG. 1 shows exemplary system 1 according to a first exemplary embodiment of the present invention. System 1 includes multiple persons, such as person 290 and person 470. System 1 also includes a plurality of vehicles, such as automobile 103 owned by person 290 and automobile 104 owned by person 470. Person 290 operates automobile 103 to travel from her home 106 to various locations, such as her place of employment, and store 55 in retailer 6. Person 290 carries a driver's license card 295 evidencing a license to operate a vehicle such as automobile 103. Person 470 operates automobile 104 to travel from her home to various locations, such as store 55 in retailer 6. Person 470 carries a driver's license card 215 evidencing a license to operate a vehicle such as automobile 104.

These licenses and license cards 215 and 295 license were issued under the authority of a government agency, such as the Florida Department of Motor Vehicles (DMV) by Motor Vehicle Department 108, which is a part of the Florida State Government. Occasionally, persons 290 and 470 must display their driver's license cards to state officials, such as policeman 110 to prove they are authorized to operate an automobile.

Figure 2B:
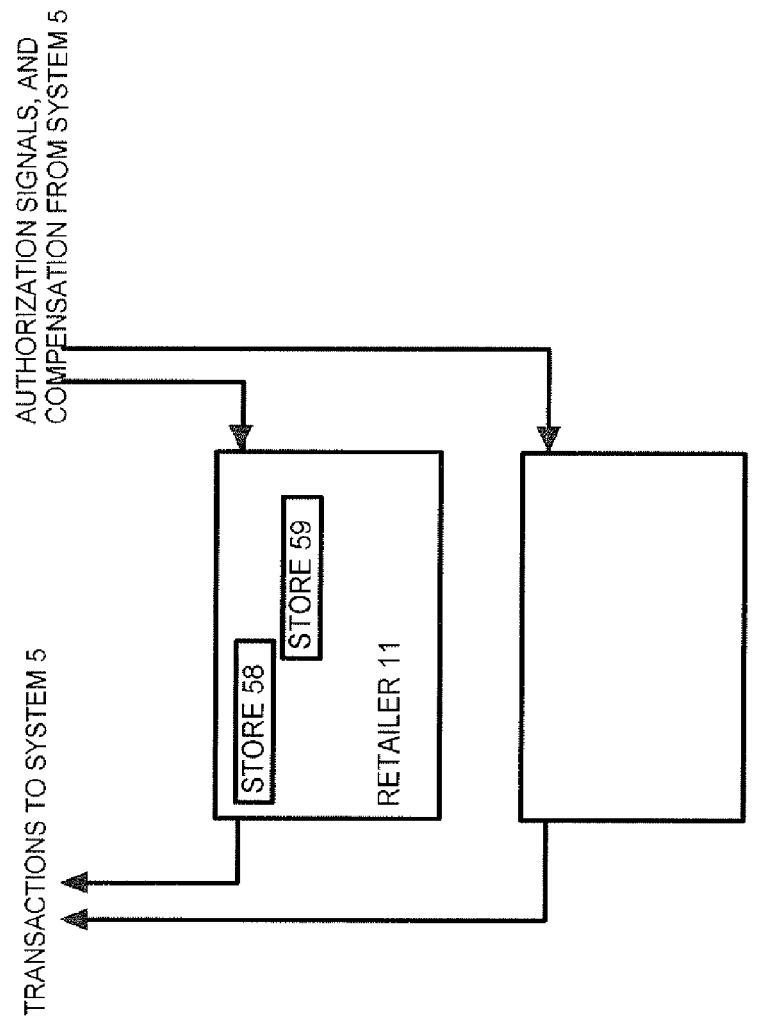

FIGS. 2A and 2B emphasize other aspects of System 1. System 1 includes system 5, communicating with retailer 6, retailer 10, retailer 11, and other retailers, via circuitry at retail sites, as described in more detail below. System 5, located in Reston, Va., receives signals from the retailers, to validate customer authorization at the time of a retail transaction, and to debit a customer account later. A signal from a retailer to system 5 is represented by a directed line going from the retailer to system 5; and a signal from system 5 to a retailer is represented by a directed line going from system 5 to the retailer.

In response to a signal from retailer 6, for example, system 5 conditionally generates a transaction authorization signal.

In response to the transaction authorization signal from system 5, retailer 6 allows a customer transaction to proceed.

System 5 is owned and operated by a private entity that is under the general control of neither the Florida State Government nor the Virginia State Government. Of course the private entity that owns and controls system 5 may have certain statutory, regulatory, contractual, or common law obligations to these state governments, as any persons resident in a state would have.

The owner of system 5 and the owner of retailer 11 are non-affiliated, meaning that they are not affiliates with respect to each other. Is this patent application, concerns are affiliates of each other when one concern controls or has the power to control the other, or a third party or parties controls or has the power to control both. Power to control is described in Section 121 of the U.S. regulations of the Small Business Administration.

The owner of system 5 and the owner of retailer 6 are non-affiliated.

The owner of system 5 and the owner of retailer 10 are non-affiliated.

Figure 3A:
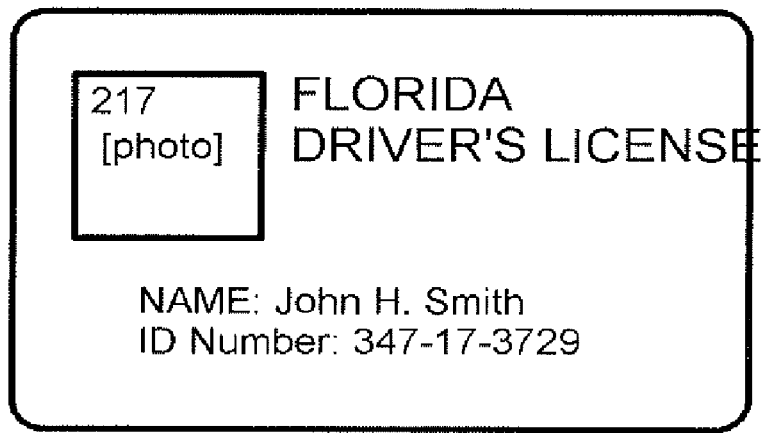
FIGS. 3A and 3B show a driver's license card in the first exemplary system.
Figure 3B:
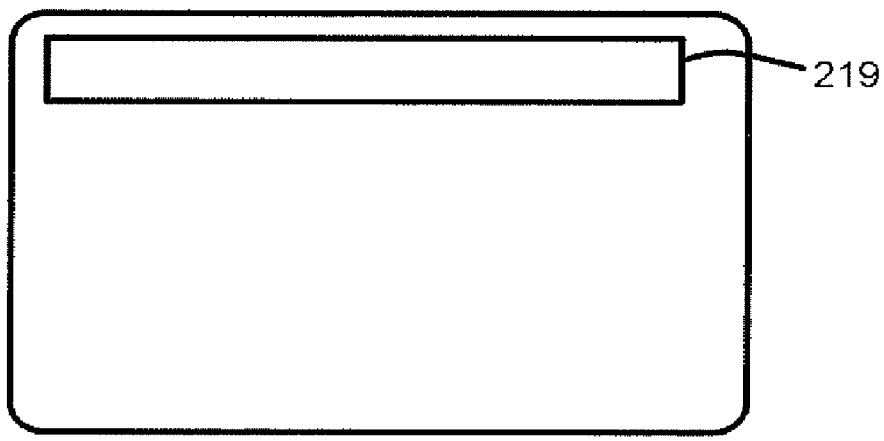

FIG. 3A shows a front, plan view of card 215 carried by person 470, who is a customer in system 1, and FIG. 3B shows a back, plan view of card 215. In this example, card 215 is a state-issued driver's license including a photograph 217 of person 470, and magnetic stripe 219 storing the ID number and other information on the reverse side. Track 2 of stripe 219 also stores the number 636010, indicating the jurisdiction of Florida, in accordance with International Standard ISO 7812.

Figure 4A:
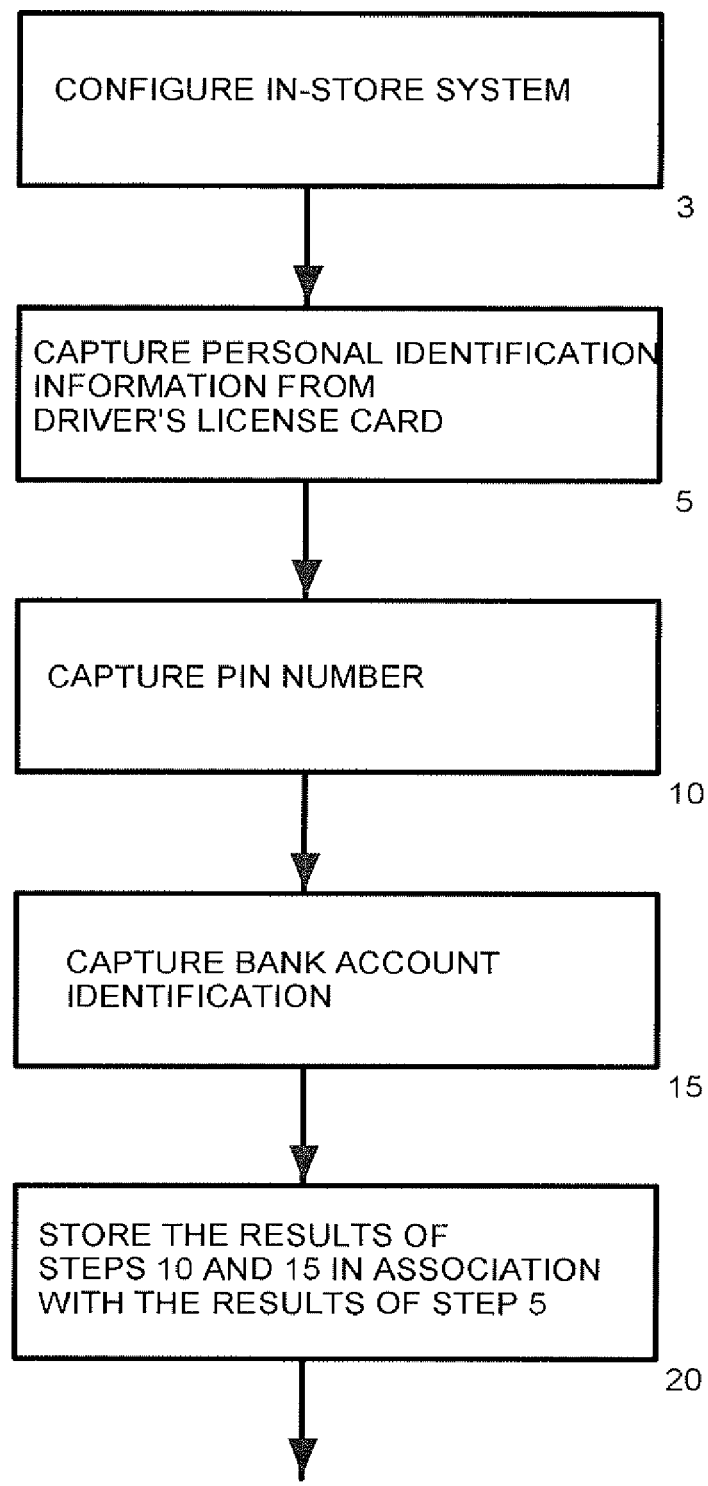
FIGS. 4A, 4B, and 4C are a flowchart of a process performed in the first exemplary system.
Figure 4B:
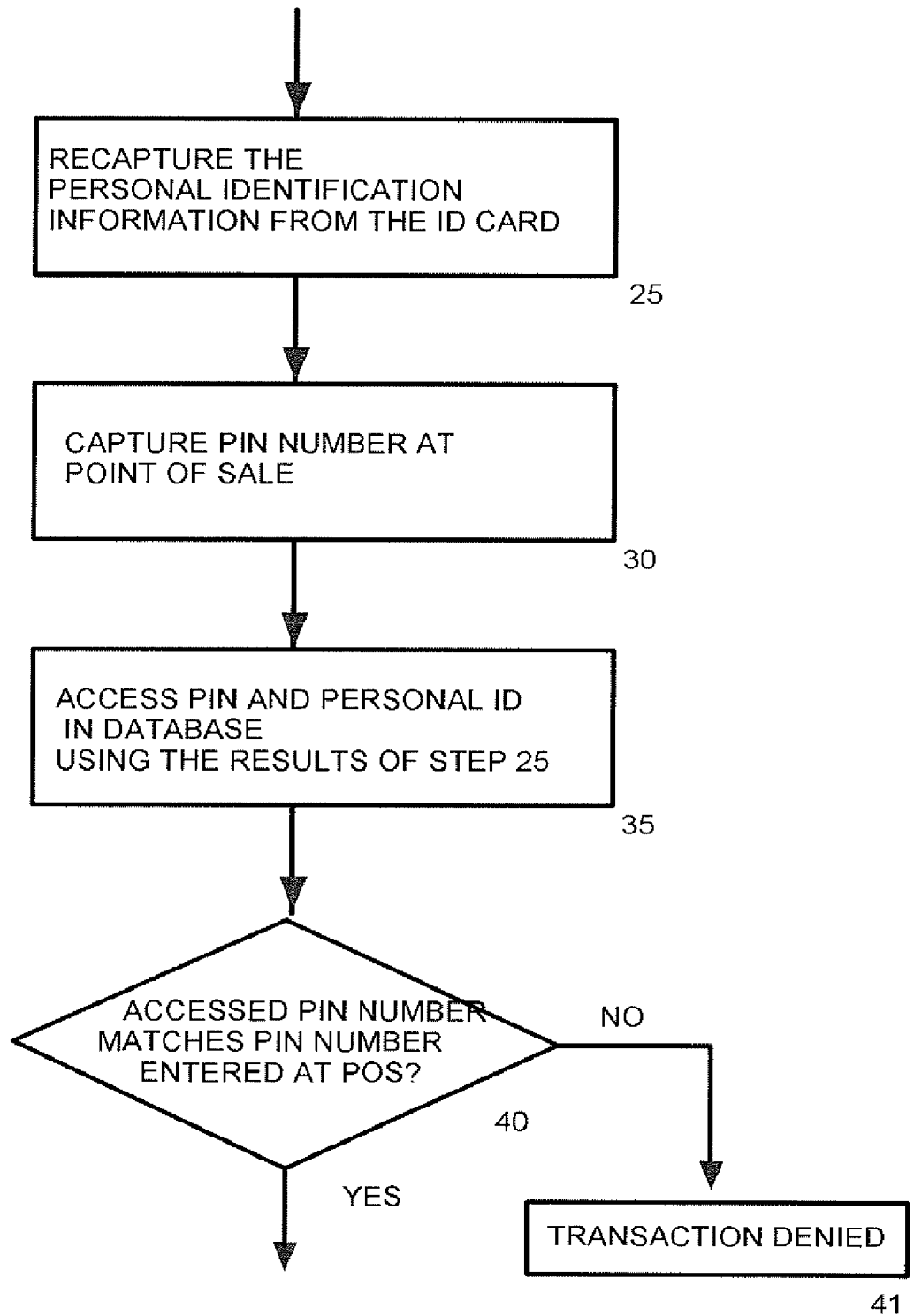
Figure 4C:
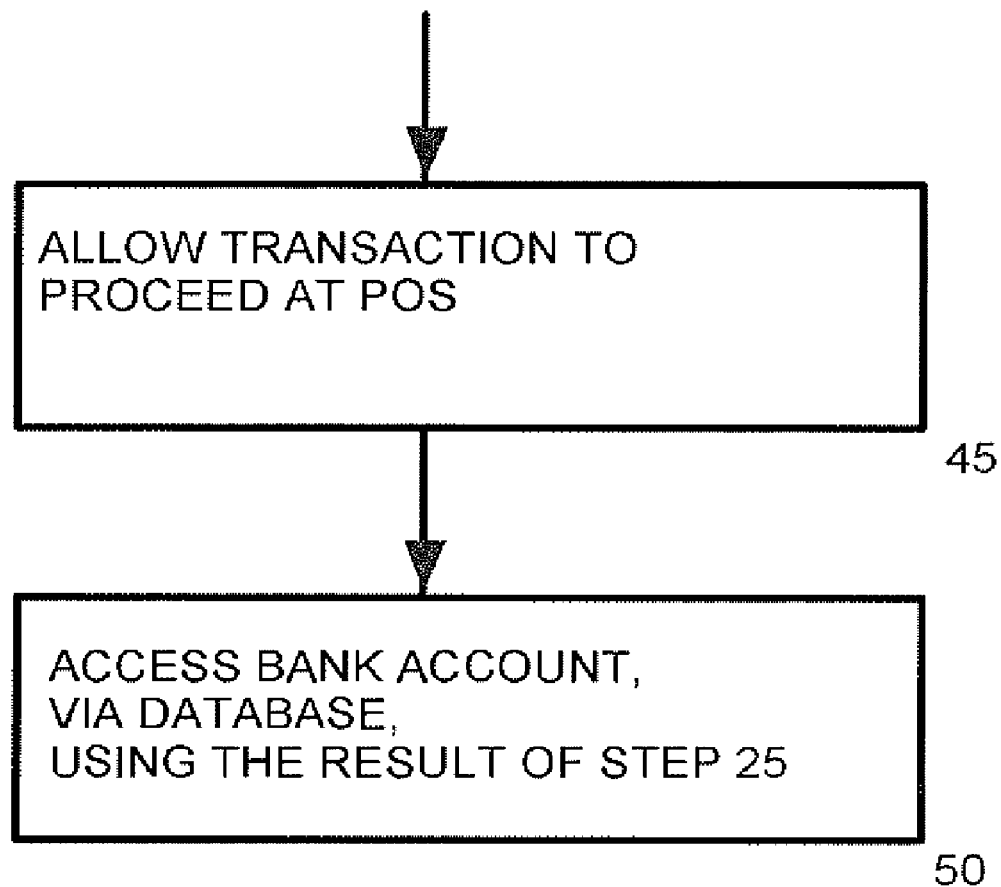

FIGS. 4A, 4B, and 4C show a process performed by circuitry in system 1. Steps 5, 10, and 15 are performed for multiple persons, in a store of a retailer, such as retailer 10. In order to enroll in the program, the customer enters a card number and bank account number at a web site. Alternately, the customer is processed at the retailer customer service area, where the magnetic stripe 219 of card 215 is scanned (step 5), a personal identification number (PIN) entry is received from the consumer into the terminal (step 10), and a personal check is scanned (step 15). The collection of the card identification number, PIN, the bank routing and account number read from the check, then becomes part of transmitted packet to system 5, in which they are stored in association in a database (step 20). The method and protocol for this transmission is uses ISO 8583 or Web-based URLs via a Secure Socket Layer (SSL) link.

Figure 6A:
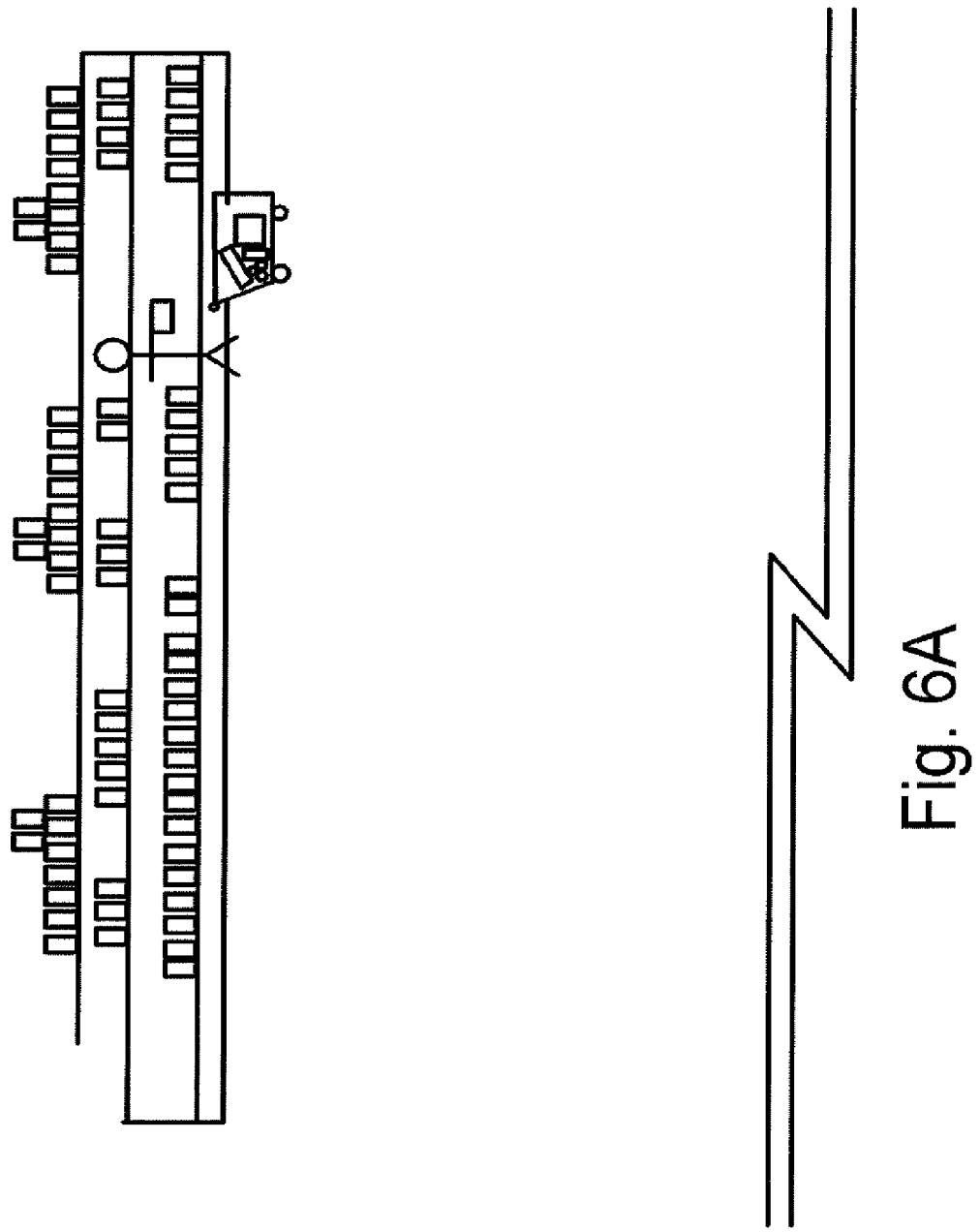
FIGS. 6A, 6B, and 6C show a retail grocery store in the first exemplary system.
Figure 6B:
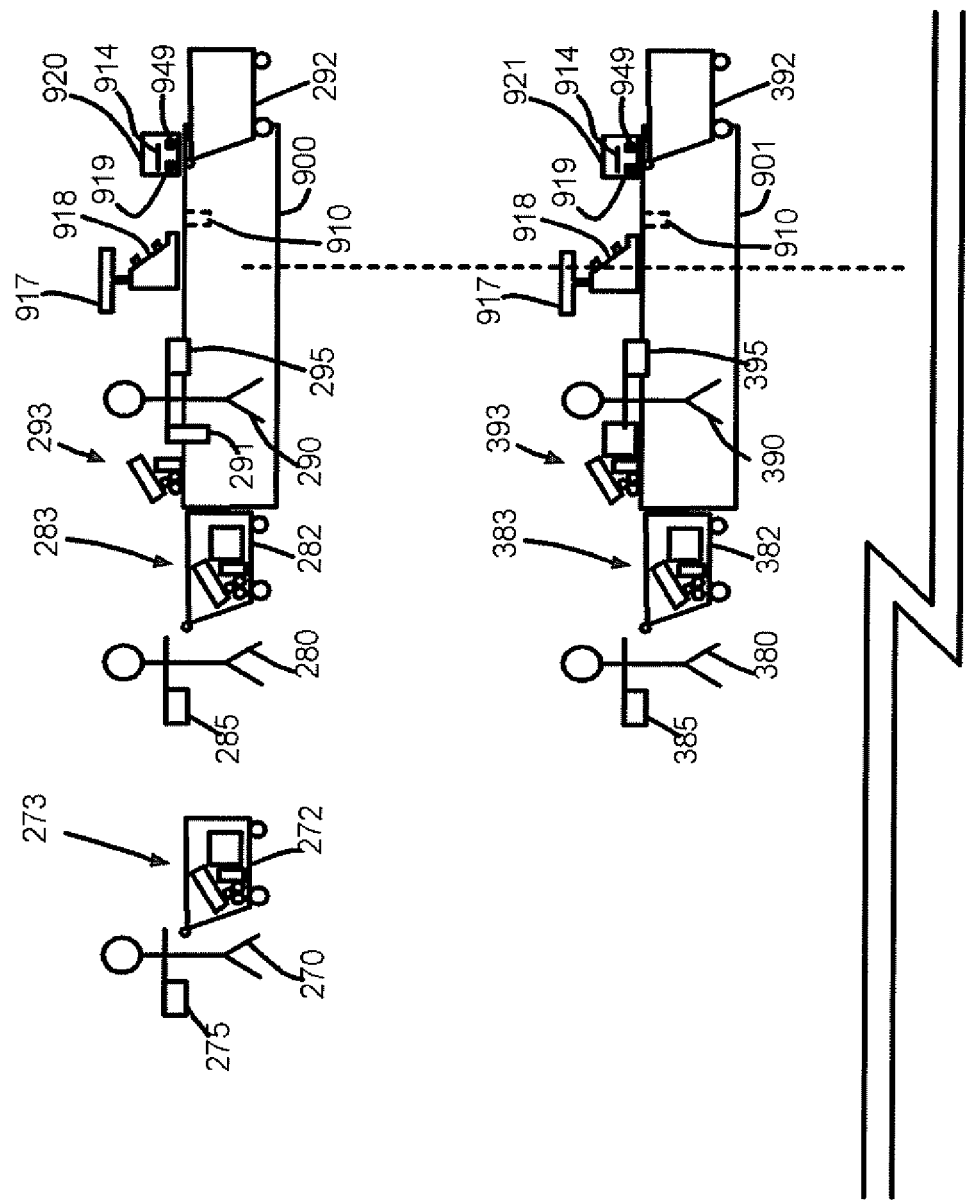
Figure 6C:
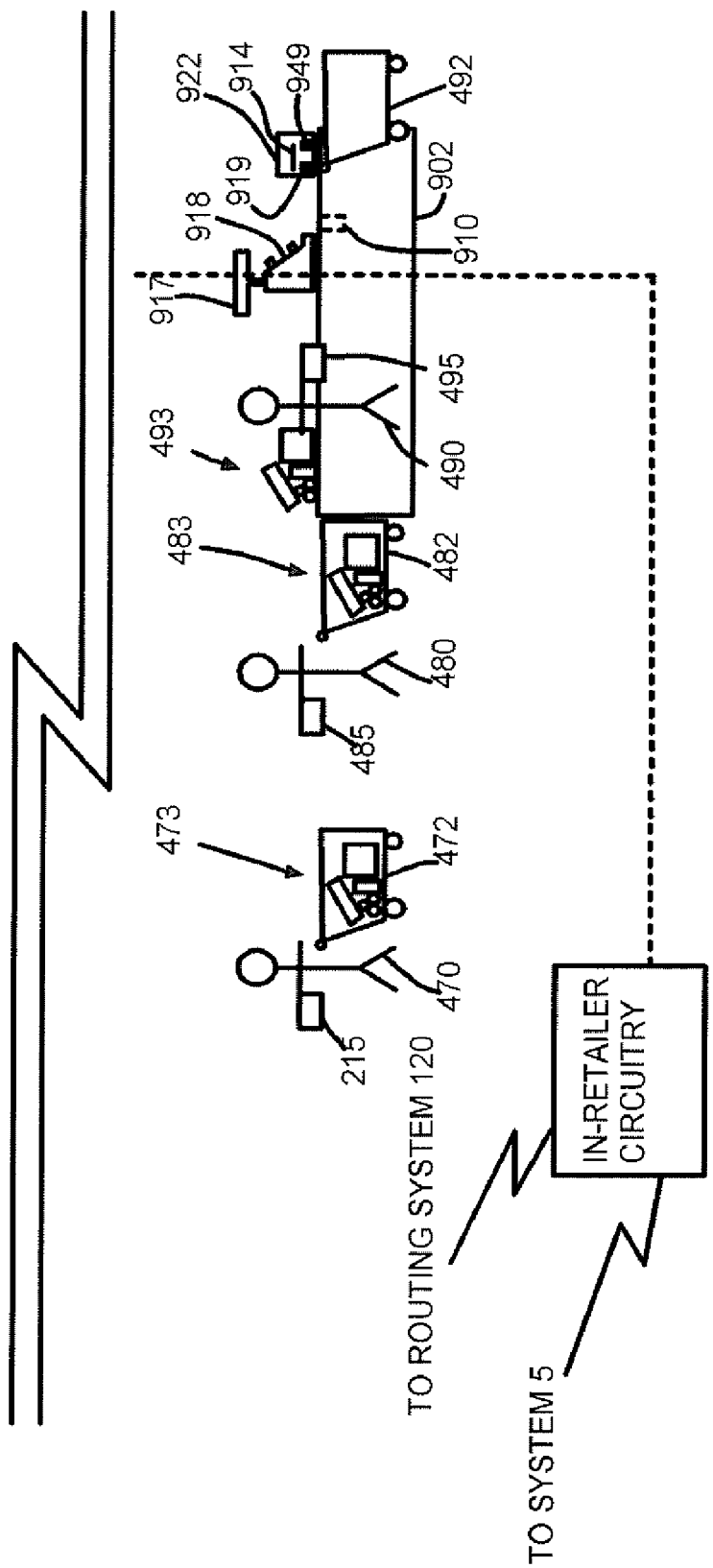

FIGS. 6A, 6B, and 6C show a context in which subsequent steps of the flow chart of FIGS. 4A, 4B, and 4C are performed. FIGS. 6A, 6B, and 6C are each a partial view of store 55 in retailer 10. Store 55 has a plurality of product areas, each corresponding to a respective product, and checkout stations 900, 901, and 902. Each checkout station includes a bar code reader that detects an optical (electromagnetic) signal reflected from a bar code, and a magnetic stripe reader that scans a magnetic card. Checkout station 900 includes payment terminal 920 having a card interface slot 914, checkout station 901 includes payment terminal 921 having a card interface slot 914, and checkout station 902 includes payment terminal 922 having a card interface slot 914. Each payment terminal includes a button 919 labeled "CREDIT" and a button 949 labeled "DEBIT". Each of these buttons is one kind of user interface object.

Upon completion of shopping, each customer brings selected products from the shelves to checkout station 900, 901, or 902.

Each customer presents her customer card. In this example, customer 490 presents credit card 495, which is associated with an installment payment account of customer 490. Customer 480 presents debit card 485, which is associated with a demand bank account of customer 480. Customer 470 presents system-5-registered driver's license card 215.

Customer 490 completes the purchase of her selected products 493 by transferring products 493 from her cart 492 to station 902, and by presenting card 495. A checkout clerk (not shown) scans each selected product past bar code reader 910, or enters the product selection information manually via keyboard 918. Checkout station 902 determines a total amount due and prints the total amount due on display 917. Customer 490 activates credit button 919. In response to the activation of credit button 919, circuitry in retailer 10 transmits the account number of card 495 to a credit/debit card authorization provider, such as credit card system 4 shown in FIG. 6, via routing system 120. Credit card system 4 could be operated by the VISA corporation.

Routing system 120 has been configured, in accordance with a network address, or network position, of systems 4 and 7, so that certain signals will be sent to systems 4 and 7, as described in more detail below. Services from payment processors—such as First Data Corporation, RBS Lynk, or Fifth Third—may implement routing system 120.

In this patent application, the word circuitry encompasses dedicated hardware, and/or programmable hardware, such as a CPU or reconfigurable logic array, in combination with programming data, such as sequentially fetched CPU instructions or programming data for a reconfigurable array.

Customer 480 completes the purchase of her selected products 483 by transferring products 483 from her cart 482 to station 902, and by presenting card 485. The checkout clerk scans selected products past bar code reader 910. Checkout station 902 determines a total amount due and prints the total amount due on display 917. Customer 480 activates debit button 949. In response to the activation of debit button 949, circuitry in payment terminal 922 prompts customer 480 to enter a PIN into a keypad on terminal 922. Terminal 922 then applies an encryption key to the entered PIN, to generate an encrypted PIN. Circuitry in retailer 10 then transmits the encrypted PIN and the account number of card 485 to a credit/debit card authorization provider, such as Honor, Star, or Interlink shown in FIG. 6, via routing system 120.

Customer 470 completes the purchase of her selected products 473 by transferring products 473 from her cart 472 to station 902, and by presenting driver's license card 215. The checkout clerk scans selected products past bar code reader 910. Checkout station 902 determines a total amount due and prints the total amount due on display 917. Station 902 reads the ID information of person 470 from card 215, and reads the Issuer Identification Number, 636010, indicating the State of Florida, from driver's license card 215. (step 25) (FIG. 3B). Customer 470 or the clerk activates credit button 919. In response to the activation of credit button 919, circuitry 151 (FIG. 7) in retailer 10 sends a signal to terminal 922, causing terminal 922 to prompt customer 470 to enter a PIN into a keypad on terminal 922. Terminal 922 then sends the entered PIN to circuitry 151, without applying the encryption key to the entered PIN. Circuitry 151 then applies an encryption key to the PIN received from terminal 922, to generate an encrypted PIN. Circuitry in retailer 10 then transmits the encrypted PIN and the license identification of driver's license card 215 to system 5, via circuitry 151. At this time the circuitry also transmits retailer ID, store ID date, time, lane ID, cashier ID, transaction amount.

Alternatively, station 902 may be configured so that customer 470 need not activate the credit button 919. In this alternative, station 902 detects the IIN of the card and conditionality applies an encryption key to the entered PIN depending on the detected IIN. In other words, in this example, station 902 word detects the IIN of card 215 and sends the entered PIN without applying the encryption key to the entered PIN.

Circuitry in system 5 uses the ID number of the card, transmitted by the server, to access the associated PIN stored in the database. (step 35). System 5 thus compares the PIN, transmitted by the store server, to the PIN read from the database. (step 40). Depending upon the result of step 40, system 5 conditionally responds to the store server with a card-authorized signal, causing station 902 to allow customer 470 to carry away products 473. (step 45).

Otherwise system 5 sends a card-not-authorized signal to the store server.

Step 40 may also include real-time communication to an external database to validate the card against a negative check database.

It is presently preferred that system 5 validate incoming transactions and respond back to the store within several seconds.

Figure 8:
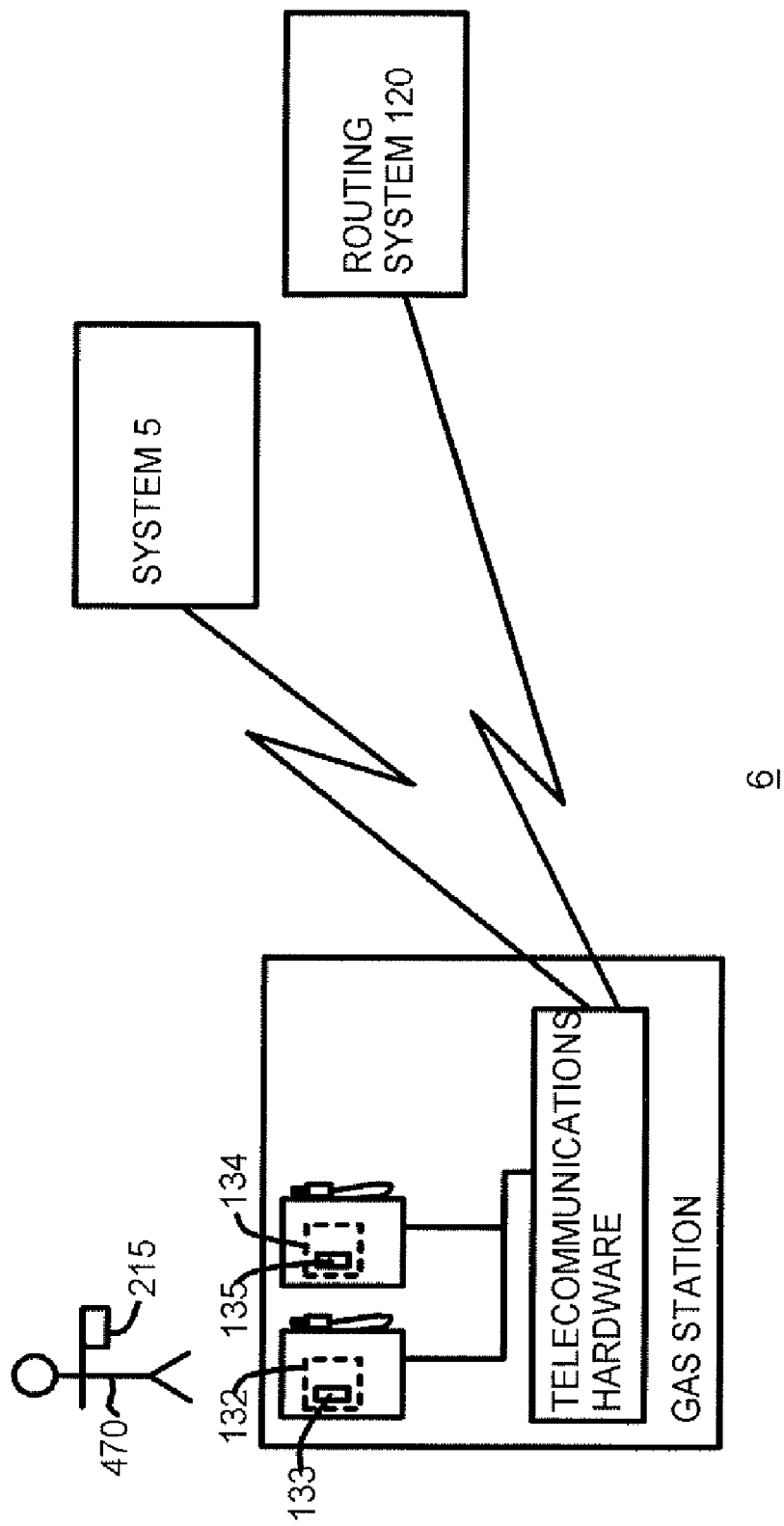
FIG. 8 shows another retail site in the first exemplary system.

FIG. 8 shows retailer 6 in system 1 in more detail. Retailer 6 is a gas station. The gas station includes gas pump point of scale (POS) terminal 132 with card interface 133, gas pump POS terminal 134 with card interface 135, telecommunications circuitry, and a network cable coupling POS terminal 132, POS terminal 134 and telecommunications circuitry together.

Customer 470 buys gas by presenting card 215, either at the payment terminal 132 or elsewhere in the gas station. The gas station reads the ID information from card 215.

Circuitry in system 5 uses the ID number of the card, transmitted by circuitry in retailer 6, to access the associated PIN stored in the database. System 5 conditionally responds to the server in retailer 6 with a card-authorized signal, or a card-not-authorized signal. If the server receives a card-authorized signal, the transaction proceeds and the server then transmits a transaction amount to system 5.

Automated Clearing House (ACH) Settlement transmission occurs daily in batch fashion. (step 50). More specifically, system 5 compiles a file at end of day for submission to the ACH services. The required fields that this file contain are: date, time, transaction type, retailer ID, store ID, bank routing #, bank account #, amount of transaction. The specifics and file format is further defined with the ACH processor.

Status from ACH is collected and logged for review.

Figure 7:
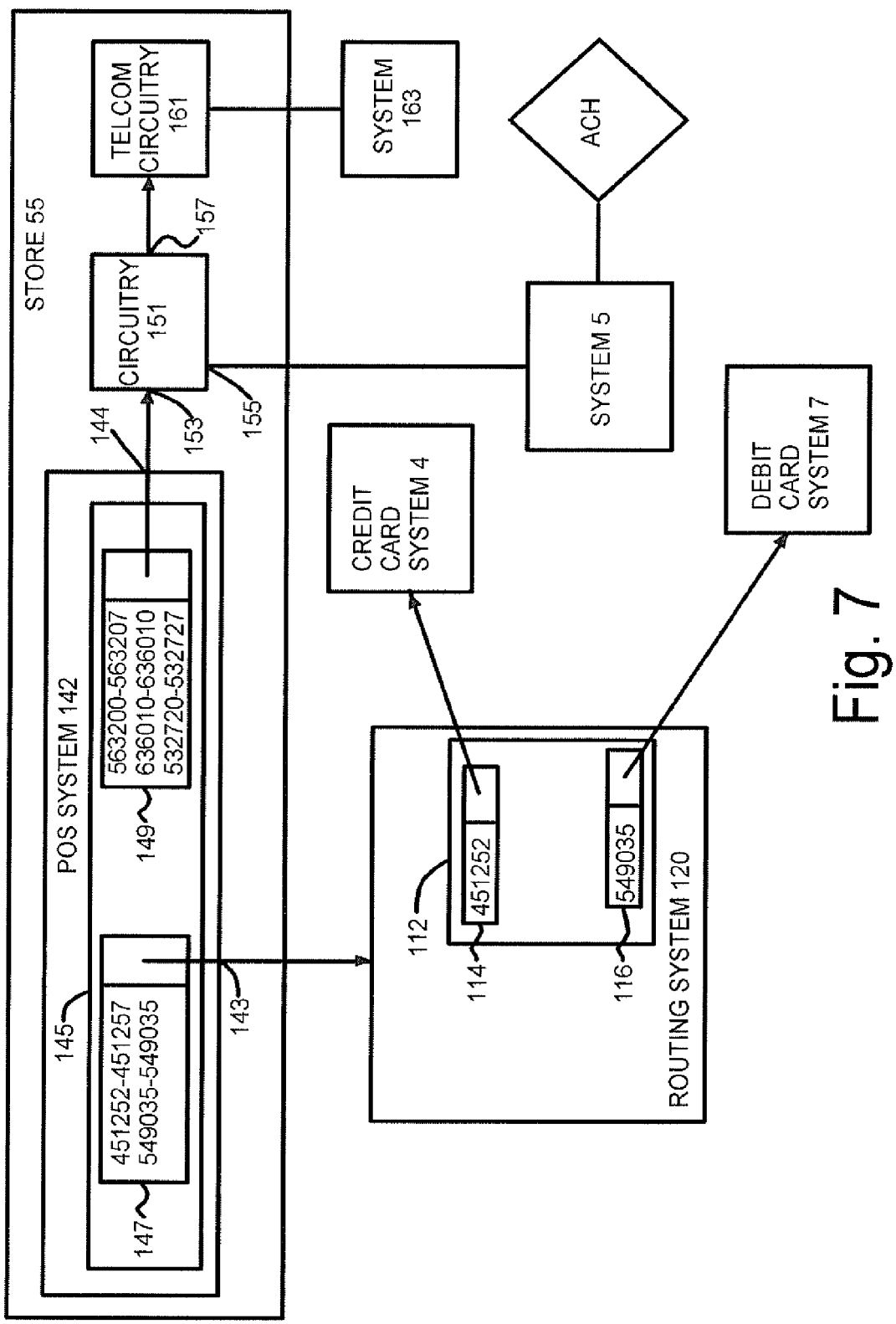
FIG. 7 is a diagram showing transaction flows in the first exemplary system.

FIG. 7 shows another aspect of the first exemplary system, including circuitry in store 55. Point of Sale (POS) system 142 receives data read from cards presented by customers in store 55. POS system 142 includes data structure 145, accessed by programs in system 142. Data structure 145 allows system 142 to select the path of a card data received from a checkout, as a function of an issuer identification number (IIN) in the card data. POS System 142 may be a Verifone Ruby system, for example, and data structure 145 maps ranges of IIN numbers to a port.

For example, when system 142 receives card data containing an IIN in the range 451252 to 451257, or 549035 to 549035, system 142 accesses UN ranges 147, to send a transaction request to routing system 120, via port 143 on system 142.

When system 142 receives card data containing an IIN in the range 563200 to 563207, 636010 to 636010, or 532720 to 532727, system 142 accesses IIN ranges 149, to send a transaction request to circuitry 151, via port 144 on system 142.

Routing system 120 includes a data structure 112, accessed by programs in routing system 120. Data structure 112 allows routing system 120 to select the path of a transaction request packet received from a retailer, as a function of a routing field in the packet. The routing field may contain an issuer identification number (UN). For example, when routing system 120 receives a transaction request packet containing the number 451252 in the routing field, routing system 120 accesses entry 114, to send the packet to credit card system 4, allowing system 4 to authorize a credit card transaction. When routing system 120 receives a transaction request packet containing the number 549035 in the routing field, routing system 120 accesses entry 116, to send the packet to debit card system 7, allowing system 7 to authorize a debit card transaction.

When circuitry 151 receives a transaction request packet on port 153 of circuitry of 151, circuitry 151 sends a corresponding packet out on port 155 of circuitry 151 if the IIN is 636010, or out on port 157 otherwise.

Figure 10:
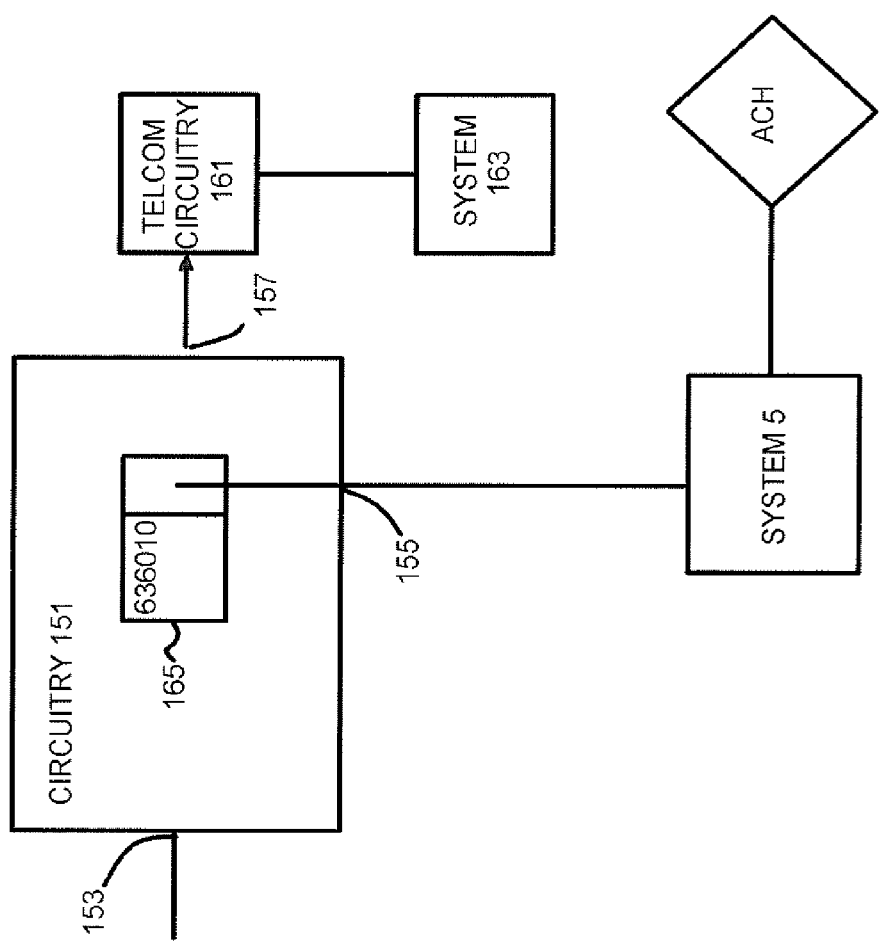
FIG. 10 is a diagram emphasizing certain features of the circuitry shown in FIG. 7.

FIG. 10 shows other aspects of circuitry 151 in more detail. Circuitry 151 receives transaction messages, each including an IIN, from POS 142. Circuitry 151 includes data structure 165, accessed by programs in circuitry 151. Data structure 165 allows circuitry 151 to select the path of a transaction message, as a function of an issuer identification number (IIN) in the message.

For example, when circuitry 151 receives a message containing an IIN of 636010, circuitry 151 detects this fact by accessing data structure 165, to send the message to system 5 via port 155. On the other hand, when circuitry receives a message containing an IIN that is not represented in data structure 165, circuitry 151 sends the message out on port 157, to system 163 via telecommunications circuitry 161.

Alternatively, these switching decisions could be made outside of the store, but still within the confines of the retailer, as described in U.S. Application Ser. No. 60/724,806 of JOSEPH R. RANDAZZA AND DANILO PORTAL filed Oct. 11, 2005 for PAYMENT SYSTEMS AND METHODS, the contents of which are herein incorporated by reference.

FIG. 9 is a representation of a table 7 in a disk-resident database in system 5. Each row in table 7 is an association between a card ID and other data such as an account number associated with the card ID, and a PIN associated with the account.

The application will have user interface to activate/inactivate/delete and reissue a card. Transaction logging contains detail information for each payment transaction. For example, the detail includes time stamp: store ID: lane ID: cashier ID: card #: payment amount: swiped vs. bar-coded.

In summary, a point-of-sale payment transaction is effected via a State issued motor vehicle driver's license card and a personal identification number (PIN) as a mechanism of payment for a retail store transaction. A process by which a State issued motor vehicle driver's license is effected to identified a consumer for initiating a payment at the Point of Sale, without the use of any other form of payment.

The POS allows the driver's license to be used as a form of payment to debit a consumer checking account or savings account as a electronic fund transfer using the Federal Reserve Automatic Clearing House (ACH) for settlement.

The system utilizes the driver's license card; a PIN for authentication; POS/payment terminal equipment; a communications network to link to retailers POS system to a ACH host processor; a data base with registered consumers banking information; the ACH system for settlement. The system can be used at any retail facility that installs the system. These include Supermarkets, Convenience stores, gas stations, General Merchants or Restaurants etc.

Figure 5:
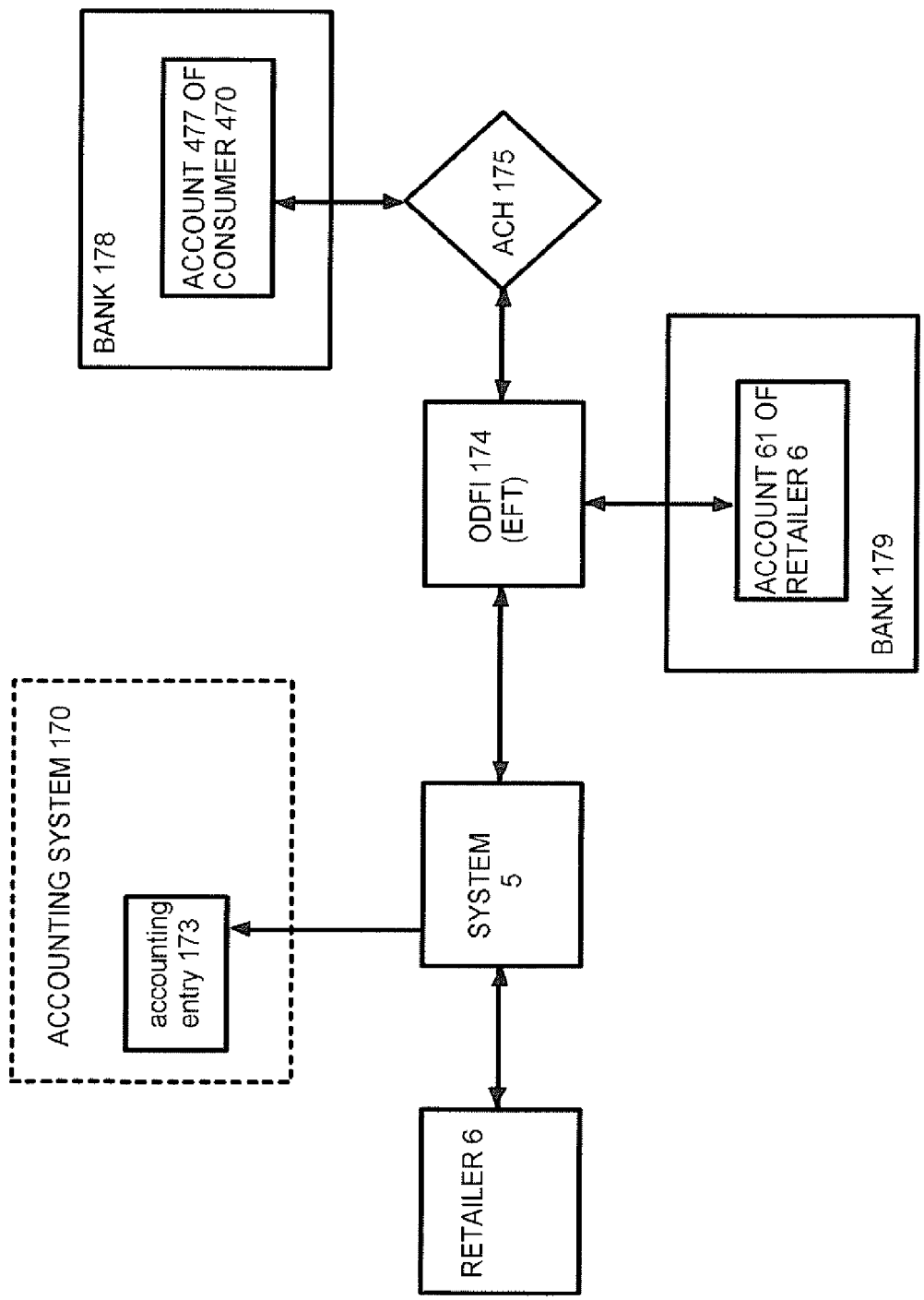
FIG. 5 shows another aspect of the exemplary system.

FIG. 5 is a diagram emphasizing other aspects of the exemplary system.

ODFI (Originating Depository Financial Institution) 174 originates a PPD (Prearranged Payment and Deposits) ACH entry at the request of system 5. ODFI 174 sends the PPD entry to the Federal Reserve ACH system 175, which passes the entry to bank 178, which acts as a Receiving Depository Financial Institution (RDFT), where account 477 is issued debit, provided there are sufficient funds. Thus ODFI 174 effects an Electronic Funds Transfer (EFT).

When system 5 settles a transaction by causing the transfer of funds from account 477 of consumer 470 to account 61 of retailer 6, system 5 makes an entry in accounting system 170, to effectively increment an amount 173 owed by the retailer 6 to the owner of system 5. This amount is a fee for settling the transaction.

Second Exemplary System

Figure 11:
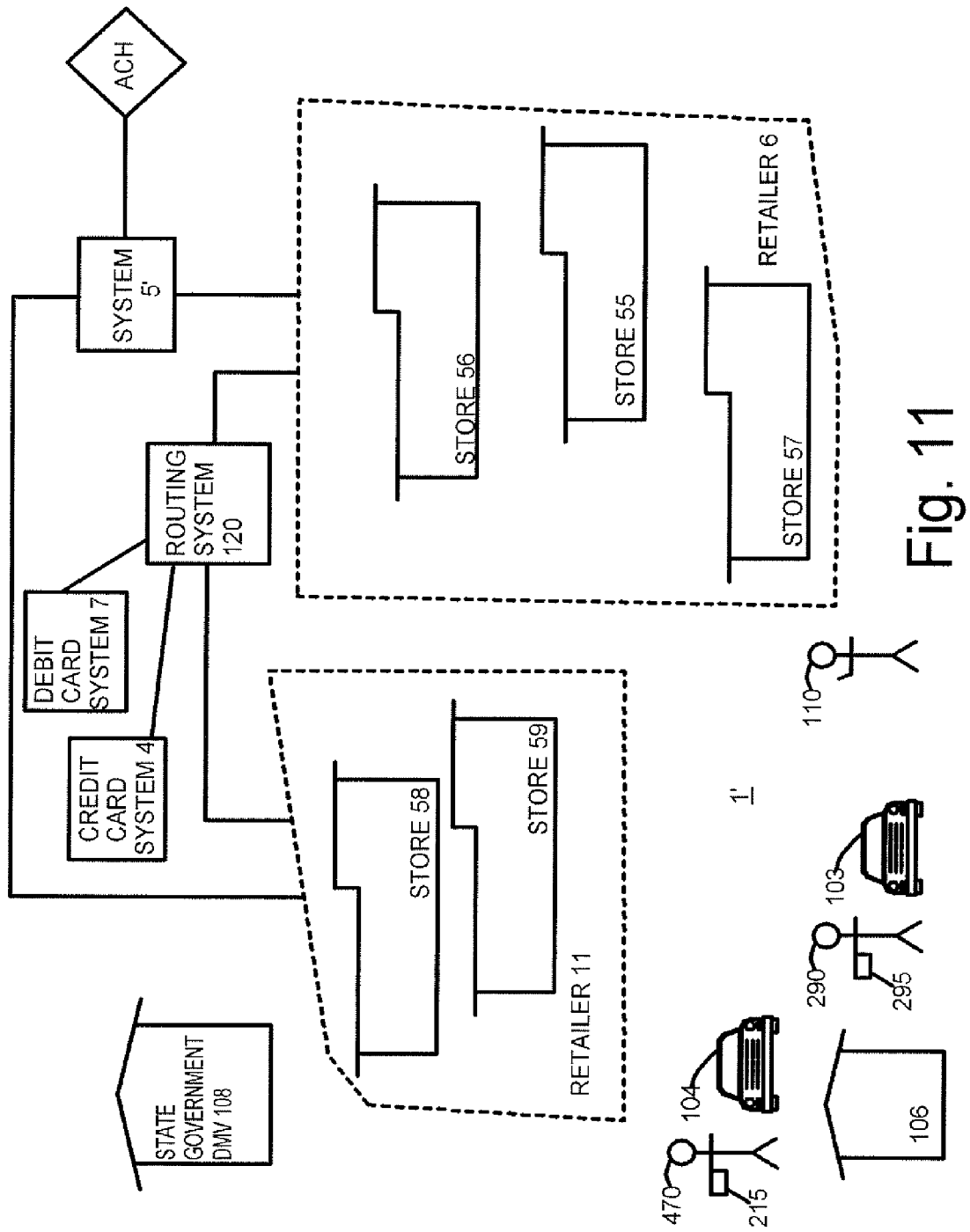
FIG. 11 shows a system according to a second exemplary embodiment of the present invention.

FIG. 11 shows exemplary system 1' including system 5' according to a second exemplary embodiment of the present invention. System 5' has all the circuitry for effecting the functionality of system 5 in the first preferred embodiment. System 5' has circuitry to perform additional processing, including a retailer-specific velocity check as described below. Velocity thresholds may vary with the retailer or type of industry. For example, the threshold for grocery stores may be different from the threshold for gas stations.

FIG. 12 is a representation of a data structure 181 in system 1'. Data structure 181 is in a disk-resident database in system 5'. Each row in data structure 181 represents an association between a card ID and a set of velocity thresholds. Each threshold corresponds to a retailer set. A retailer set may contain one or more retailers.

In this example, the first column after card ID is a velocity threshold for a grocery retailer set, the second column is a velocity threshold for a gas station retailer set, and the third column is a velocity threshold for another set of retailers.

A retailer may be alone in its own set.

A retailer may belong to more than one set.

Thus, system 1' may have a threshold specific to a particular retailer. The system may also have a threshold specific to a market sector, encompassing multiple retailers. For examples, the system may have a threshold that is compared to the sum of gasoline purchases occurring in the Texaco™, Sonoco™, and other gasoline stations.

FIG. 13 shows data structure 183 representing the sets corresponding to the columns of FIG. 12. Each row in data structure 183 represents a retailer set. Each retailer set includes one or more retailers.

Figures 14, 15:
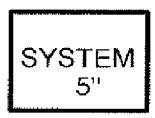
FIG. 14 shows another data structure in an exemplary system.
FIG. 15 shows a system according to a third exemplary embodiment of the present invention.

FIG. 14 shows data structure 185 storing a transaction history for each card ID. Each row of data structure 185 represents a transaction.

For example, customer 470 buys gas by presenting card 215, either at the payment terminal 132 or elsewhere in the gas station. The gas station circuitry reads the ID information from card 215. A server in retailer 6 recognizes the identification number of card 215 to be that of a system-5'-registered card and, in response to this recognition, sends the identification number of card 215 to system 5'.

Circuitry in system 5' uses the ID number of the card to select a row in data structure 181. Circuitry in system 5' uses the retailer ID to select a row in data structure 183, thereby selecting a retailer set. The selected retailer set thereby determines a column in data structure 181, thereby selecting a velocity threshold for this consumer at this retail site (row 3, column 3 of data structure 181).

System 5', for a given transaction date range in data structure 185, adds the transaction amounts for the retailer IDs that are present in the list of the row selected data structure 183. System 5' conditionally responds to the server in retailer 6 with a card-authorized signal, or a card-not-authorized signal, depending upon whether the sum is above the velocity threshold for this consumer at this retail site.

If the server receives a card-authorized signal, the transaction proceeds and the server then transmits a transaction amount to system 5'. Circuitry in system 5' then adds a row, to data structure 185, to record the transaction that just occurred in retailer 6.

Third Exemplary System

FIG. 15 shows exemplary system 5" according to a third exemplary embodiment of the present invention. System 5" has all the circuitry for effecting the functionality of system 5 in the first preferred embodiment. System 5" has circuitry to perform additional processing, including selecting from multiple accounts associated with a common card as described below.

FIG. 16 is a representation of a data structure 187 in system 5". Data structure 187 is a disk resident database in system 5". Each row in data structure 187 is an association between a card ID and one or more account numbers associated with the card ID, and a respective PIN number associated with each account.

System 5" has circuitry to select the account depending upon the PIN entered at the POS.

In an enrollment process in the third exemplary system, circuitry receives personal ID information from a driver license; and receives information corresponding to multiple accounts, each account corresponding to a respective first number (account number) previously displayed to a user, on a bank statement for example. System 5" stores a link between the ID information and the account information.

To effect the transaction at retailer 6, system 5" receives the ID information from the driver license, and receives a PIN from the holder of the license. System 5' uses the received ID information to debit a selected one of the accounts, the account being selected by the second number (PIN).

The account number has more digits than the PIN. The account number presented to the user on a paper statement, and the PIN is selected by the user. The account number has a first number of digits, and the PIN has a second number of digits less than the first number of digits. The first number of digits is at least 12, and the second number of digits is at least 4.

Fourth Exemplary System

Figure 17:
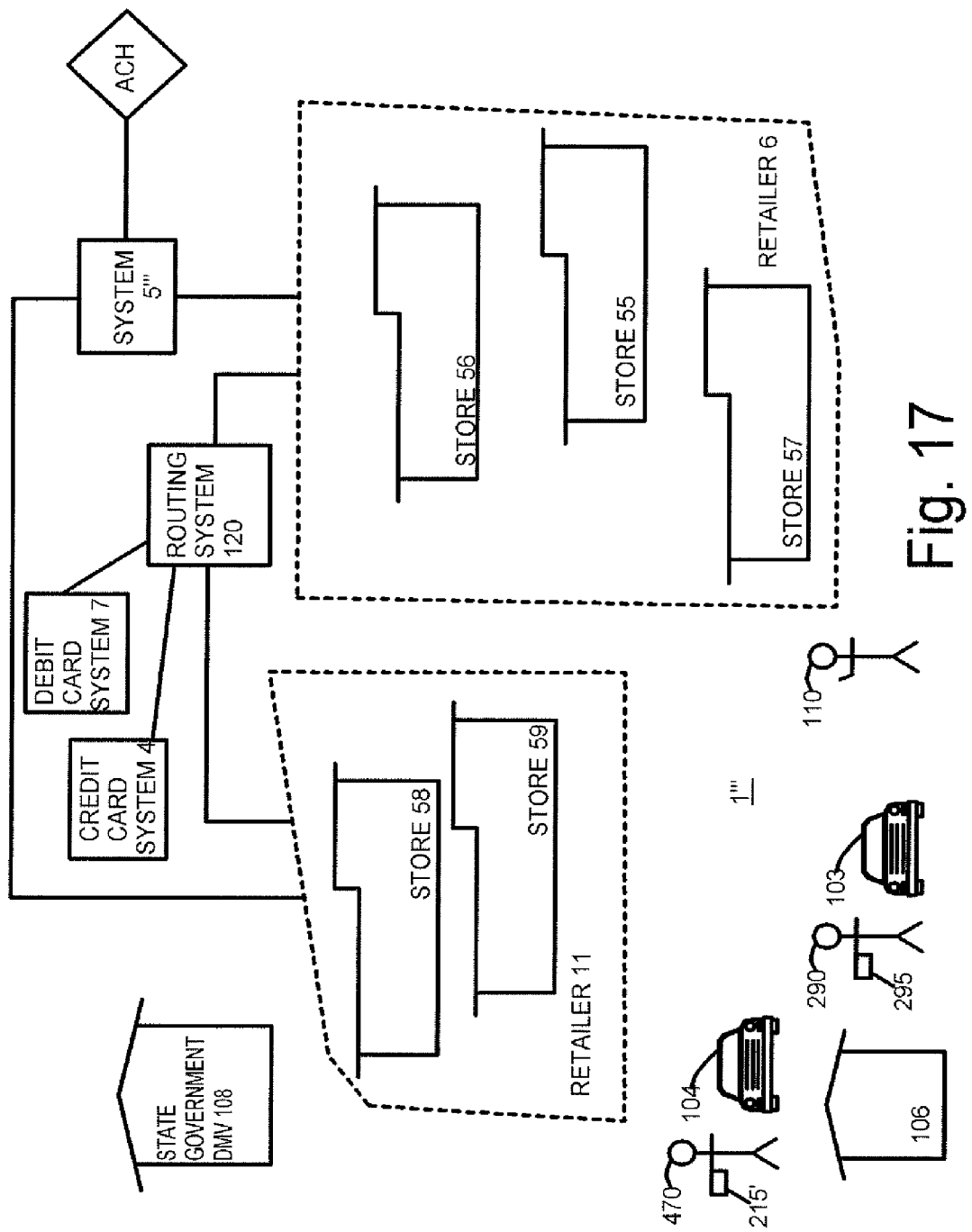
FIG. 17 shows a system according to a fourth exemplary embodiment of the present invention.

FIG. 17 shows exemplary system 1''' including system 5''' according to a fourth exemplary embodiment of the present invention. System 5''' has all the circuitry for effecting the functionality of system 5 in the first preferred embodiment. System 5" has circuitry to perform additional processing, as described below.

Figure 18A:
FIGS. 18A and 18B show a driver's license card in the fourth exemplary system.
Figure 18B:
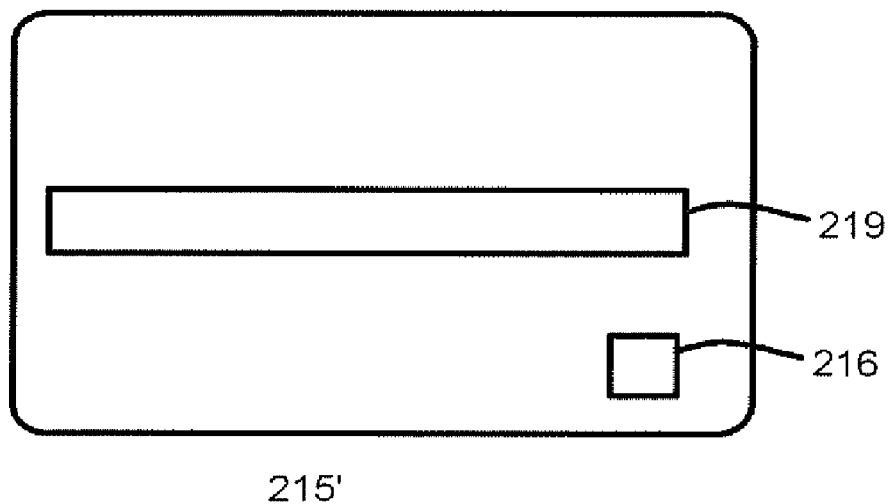

FIGS. 18A and 18B show plan view of card 215' carried by a customer in system 1''' in accordance with a fourth preferred embodiment of the present invention. Card 215' has all the features of card 215 described in connection with the first preferred embodiment.

The radio frequency identification (RFID) tag contains the consumer finger print pattern template, which is validated by a fingerprint bio terminal at POS. The RFID tag also contains the driver license Government ID number.

Thus the fourth preferred system allows for the capturing of the consumer fingerprint, the consumer is provided with adhesive RFID tag, that is placed on the back of the driver license card not interfering with the magnetic stripe of the 2D barcode. The consumer is then asked to provide a finger into the bio terminal for registration of the fingerprint. The capture fingerprint template is then transferred to the RFID tag along with the license number by providing the Driver License and RFID tag in close proximity to the RFID reader for storage.

Thus the biometric circuitry of the fourth preferred embodiment validates the fingerprint against a recorded image on an RFID tag affixed to the payment of loyalty card. There is no special communication scheme to the host, since the validation is a one to one relationship locally at the reader. Once validation is done the bioscrypt terminal sends the stored card number and a positive authorization flag. The system transmission is the same except that the field PIN contains no data.

More Detailed Description of an Exemplary System

Figure 19:
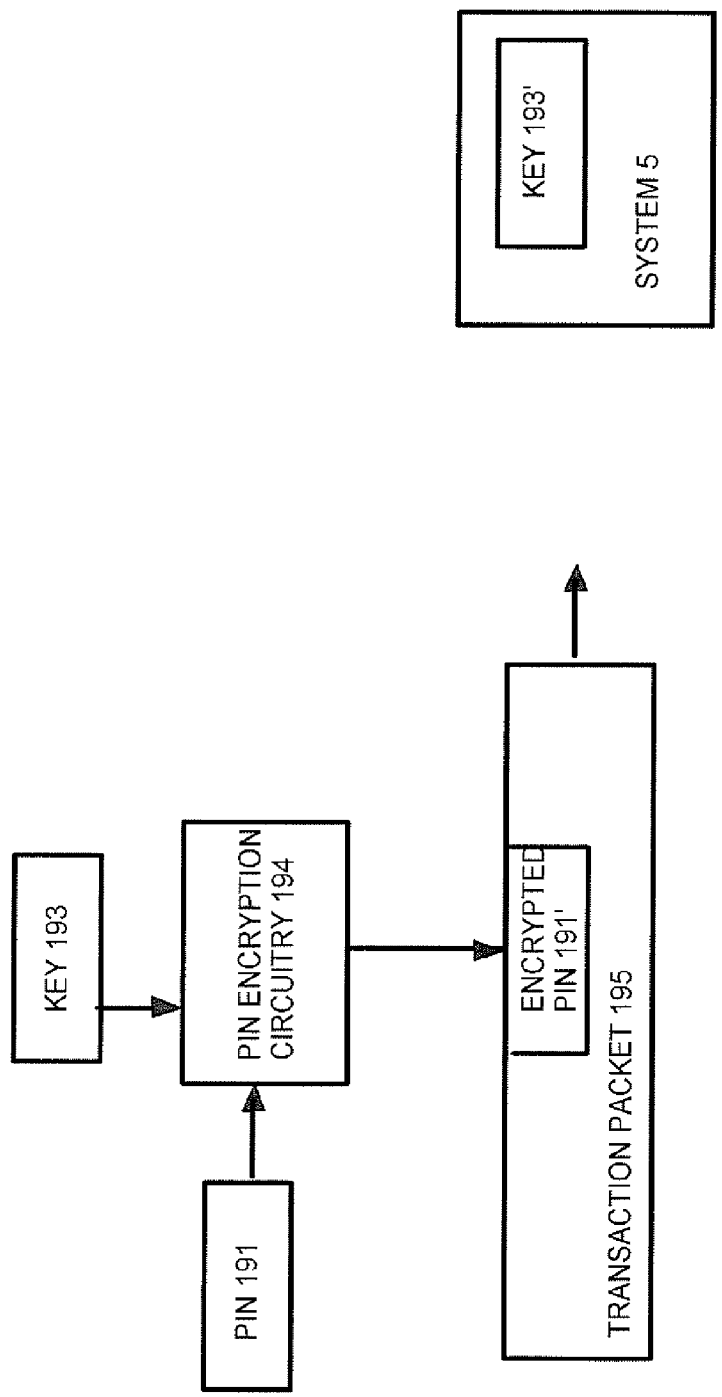
FIG. 19 is a diagram emphasizing certain features of circuitry in an exemplary system.

FIG. 19 shows other aspects of circuitry 151 in more detail. Circuitry PIN encryption circuitry 194 in circuitry 151 applies an encryption key 193 to the PIN, to generate an encrypted PIN 191' that is inserted into transaction packet 195. Other portions of transaction packet 195 are not encrypted by encryption circuitry 194. SSL (secure socket layer) encryption circuitry 196 encrypts the entire transaction packet 195 and sends the encrypted packet toward the Internet.

System 5 includes the encryption key 193' corresponding to encryption key 193, allowing system 5 to generate an unencrypted PIN. The encryption key 193' may be an asymmetric key corresponding to encryption key 193, or may be a symmetric key.

Thus, a method conditionally applies a first encryption key to a PIN, using first encryption circuitry (encryption software in terminal 922), depending on a whether a card is in a class of cards. The method conditionally applies a second encryption key to the PIN, using second encryption circuitry (circuitry 151), depending on whether the first encryption circuitry applied the first encryption key.

To enroll in the program, the customer will be processed at the retailer customer service area, where the card will be scanned, a pin entry will be asked from the consumer into a pin pad and a personal check will be imaged, the collection of the Loyalty account #, PIN, the bank routing and account # read from the check, will then become part of transmitted packet to the Payment Host Database via a secure SSL connection.

The Check readers use for reading the check information will be from Digital Check Corp, model TS-220 and MICRImage from Magtek. The PC provided by the retailer requires a USB port to attach a check reader and a keyboard inline barcode reader and pin pad. The optional biometric reader will connect to the com port of the PC. The application will register the fingerprint and save the template onto an RFID tag of the consumer card.

To effect a POS transaction, the retailer POS system accepts a new form of payment. A first option is a generic form accepted by the host, and a second option is a bit map format using ISO standard 8583.

According to the generic form, the transaction is switched out to our host according to the specifications below using HTTPS (Secure HyperText Transfer Protocol) The HTTPS standard supports certificates. We use a SSL digital certificate from a third-party certificate provider that ensures that our site is valid. This certificate gets installed on our site, and verifies that our server is a proper secure server.

To submit a transaction, a call is made to the following URL: https://www.paymentcard.com.com/transsubmit.asp It expects the following data:

| FieldName | Description | Data type |
|---|---|---|
| cardnumber | Card Number | 12-19 digits |
| PIN | PIN Number, Bio | 5 digits |
| dollaramount Dollar | Amount of Transaction | numeric |
| merchantcode | Merchant Code | Alphanumeric |
| Store # | Store # | 5 digits |

-continued

| FieldName | Description | Data type |
|---|---|---|
| Date | Date of transaction | Date |
| Time | Time of transaction | hh:mm:ss |
| POStrans# | POS transaction # from POS system | 8 digits |
| Lane# | POS lane # | 2 digits |
| Cashier# | cashier ID | 4 digits |
| ud1 | User Defined Field | Alphanumeric |
| ud2 | User Defined Field | Alphanumeric |

For applications using biometrics, there is no PIN number. The field must still exist, but it should contain no data in this case.

Merchant Code will be assigned by system 5 ud1-ud2 are User Defined fields. The data in these fields can be whatever the merchant wants. For example, if they wish to have lane # (for a supermarket) associated with a transaction, that could be in one of the User Defined fields.

Examples:

For a transaction with a PIN #:

https://www.nccswitch.com/shtranssubmit.asp?cardnumber=12345&PIN=1234&dollaramount=27.4&merchantcode=ABCD&store#=10000&date=17072005&time=10:25:15&POStrans#1740&ud1=&ud2=&

For a transaction without a PIN # (biometric verification of identity):

https://www.nccswitch.com/shtranssubmit.asp?cardnumber=12345&PIN=&dollaramount=27.4&merchantcode=ABCD&store#=10000&date=17072005&time=10:25:15&POStrans#1740&ud1=&ud2=&

Response Codes

The following is a list of the possible response codes from the server:

| Code | Meaning |
|---|---|
| AAAA | Transaction Submitted Successfully |
| NNNNNNNN | Auth# This is an 8 character authorization number return from the host for a successful transaction. |
| XMCN | Card Number Missing From Request |
| XMDA | Dollar Amount Missing From Request |
| XMMC | Merchant Code Missing From Request |
| XICN | Invalid data in Card Number field |
| XIPI | Invalid data in PIN Number field |
| XIDA | Invalid data in Dollar Amount field |
| XIMC | Invalid data in Merchant Code field |
| XDAT | Invalid Date |
| XTIM | Invalid Time |
| XIU1 | Invalid data in User Defined Field 1 |
| XIU2 | Invalid data in User Defined Field 2 |
| XPIN | PIN Number in Request Does Not Match Database |
| XNEN | Cardholder Not Enrolled |
| XHLD | Cardholder Account On Hold |
| XOVL | Cardholder Account Over Velocity Limits |
| XBLK | Cardholder Account Blocked |
| XNMA | No matching Cardholder Account Information on File |
| XDUP | Duplicate transaction - The transaction was accepted previously. |

The length of the response is a multiple of 4 characters.

It is possible to get more than one X code returned from a specific transaction. For example, if a transaction request contains invalid data in the card number field, and also the merchant code is missing, the response would be: XIC-NXMMC.

Further Description of Exemplary Enrollment Processes

The system allows the consumer to enroll into this system at a merchant location operated by store personnel, a self-service kiosk, or an interactive voice response telephone enrollment system, for example.

Thus, although consumer 470 uses a driver's license as the access mechanism for payment via system 5, other mechanisms may be used, such as association membership cards, and retailer branded cards.

The consumer enrollment process captures information identifying the consumer, to form an electronic record that is stored in a remote or local computer. Once the enrollment is complete, the consumer can use the driver's license to pay for goods and services.

System 1 provides a process mechanism (Enrollment) for linking, the consumer driver's license card, based on national standard, magnetic and 2d format to be scanned or swipe, capturing the content of the magnetic data or the decoded barcode data, using a parsing algorithm that presents the data necessary to build the electronic record required by this system. This includes the driver's license number, date of birth, age, address, state issued, date driver's license is issued, date driver's license expires, gender.

Once the driver's license card information is captured, the consumer is asked to enter a PIN. The PIN is encrypted and made part of the electronic record. Next the consumer is asked to present a blank commercial bank check; this check is scanned by check reader that will capture the image of the check, the bank routing number and the bank account. Once the above process is completed the electronic record is formed and stored in a local or remote computer depending on the merchant network infrastructure.

In accordance with an alternate enrollment process, the consumer enters his driver's license number into the enrollment website or a paper application. Background software, executing in system 5, captures the license number and builds the encoded ID number that is contained in track 2 of the driver's license. This is the number seen by computer systems, which is different than what is printed on the DL card.

For example, for a driver's license having face value ID of "P634-160-55-448-0", the consumer will enter this number as they see in the front of the card. The data on track 2 of the magnetic strip is 6360101663416055448, wherein 636010 is the IIN number for Florida, 16 represents the decimal value of the letter P in the alphabet, and 63416055448 is the actual number in the font of the card without the last 0. Thus, in this alternate enrollment process, the system reads the enrolled ID and state jurisdiction, such as Florida or Georgia, entered by the consumer, and then builds the encoded ID to match the data in track 2 of the magnetic strip.

Throughout this patent application, certain processing may be depicted in serial, parallel, multiplexed, or other fashion, for ease of description. Actual hardware and software realizations, however, may be varied depending on desired optimizations apparent to one of ordinary skill in the art.

Other systems and options for enrollment and transaction processes may be found in U.S. Application Ser. No. 60/724,806 of JOSEPH R. RANDAZZA AND DANILO PORTAL filed Oct. 11, 2005 for PAYMENT SYSTEMS AND METHODS, the contents of which are herein incorporated by reference; and U.S. Application Ser. No. 60/786,830 of JOSEPH R. RANDAZZA AND DANILO PORTAL Mar. 29, 2006 for PAYMENT SYSTEMS AND METHODS, the contents of which are herein incorporated by reference.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A method for a system having a plurality of persons, a plurality of cards issued under authority of an entity; a retail site configured with a first signal, the first signal being common to the plurality of cards; the system further including a second signal on a first card in the plurality of cards; wherein each card evidences a license for a person to operate a vehicle; and a second system storing an association between the second signal and account information, the entity and an owner of the second system being non-affiliated, the method comprising the steps of:
receiving the first and second signals from the first card;
responsive to the first signal, making a routing decision;
responsive to the routing decision, conditionally sending the second signal into a first hardware path, to cause the second system to perform the steps of
determining whether the first card can effect payment,
responsive to the determining step, conditionally sending a message to cause an institution to send an ACH entry to Federal Reserve ACH system,
making an entry in an accounting system, to effectively increment an amount owed by the owner of the retail site to the owner of the second system,
conditionally effecting a transaction with a holder of the first card, depending on a signal received from the second system.

2. The method of claim 1 wherein the signal received from the second system includes an indication whether the card is authorized to effect payment.

3. The method of claim 1 wherein the information corresponding to the account includes an account number previously presented to a consumer user on a paper statement generated by the financial institution managing the account.

4. The method of claim 1 wherein receiving the second signal from the first card includes receiving the second signal via a point of sale terminal, and the method further includes
receiving a third signal from the holder of the first card; and
sending the third signal out of the point of sale terminal, without applying an encryption key to the third signal.

5. The method of claim 4 wherein the third signal includes a PIN typed by the holder of the first card.

6. A method for a system having a plurality of persons, a plurality of cards issued under authority of an entity; a retail site configured with a first signal, the first signal being common to the plurality of cards; the system further including a second signal on a first card in the plurality of cards wherein the card is a driver license; and a second system storing an association between the second signal and account information, the entity and an owner of the second system being non-affiliated, the method comprising the steps of:
receiving the first and second signals from the first card;
responsive to the first signal, making a routing decision;
responsive to the routing decision, conditionally sending the second signal into a first hardware path, to cause the second system to perform the steps of
determining whether the first card can effect payment,
responsive to the determining step, conditionally sending a message to cause an institution to send an ACH entry to Federal Reserve ACH system;
making an entry in an accounting system, to effectively increment an amount owed by the owner of the retail site to the owner of the second system,
conditionally effecting a transaction with a holder of the first card, depending on a signal received from the second system.

7. The method of claim 6 further including
receiving a number from the holder of the first card, wherein sending the second signal includes sending the second signal to cause a debit to a selected one of multiple accounts associated with the holder, the account being selected by the number.

8. The method of claim 7 wherein the number is a personal identification number selected by the user, the number having less digits than the account number.

9. The method of claim 7 wherein the number is a personal identification number selected by the user, the number having at least 4 digits, and less digits than the account number.

10. A method for a system having a plurality of persons, a plurality of vehicles; a plurality of cards issued under authority of government, each card evidencing a license for a person to operate a vehicle; a retail site configured with a first signal, the first signal including a license card IIN number, the first signal being common to the plurality of cards; the system further including a second signal on a first card in the plurality of cards, the second signal including a personal ID number; and a server storing an association between the second signal and account information, the method comprising:
receiving the first and second signals from the first card;
responsive to the first signal, making a routing decision;
responsive to the routing decision, conditionally sending the second signal into a first hardware path, to cause the second system to perform the steps of
determining whether the first card can effect payment,
responsive to the determining step, conditionally sending a message to cause an institution to send an ACH entry to Federal Reserve ACH system,
making an entry in an accounting system, to effectively increment an amount owed by the owner of the retail site to the owner of the second system,
conditionally effecting a transaction with a holder of the first card, depending on a signal received from the server.

11. The method of claim 10 wherein the signal received from the server includes an indication whether the card is authorized to effect payment.

12. The method of claim 10 wherein the government is a first state government, and the server is in the territory of a second state government.

13. The method of claim 10 wherein receiving the second signal from the first card includes receiving the second signal via a point of sale terminal, and the method further includes
receiving a third signal from the holder of the first card; and
sending the third signal out of the point of sale terminal, without applying an encryption key to the third signal.

14. The method of claim 13 wherein the third signal includes a PIN typed by the holder of the first card.

15. The method of claim 10 further including
receiving a number from the holder of the first card, wherein sending the second signal includes sending the second signal to cause a debit to a selected one of multiple accounts associated with the holder, the account being selected by the number.

* * * * *